UNITED STATES PATENT OFFICE.

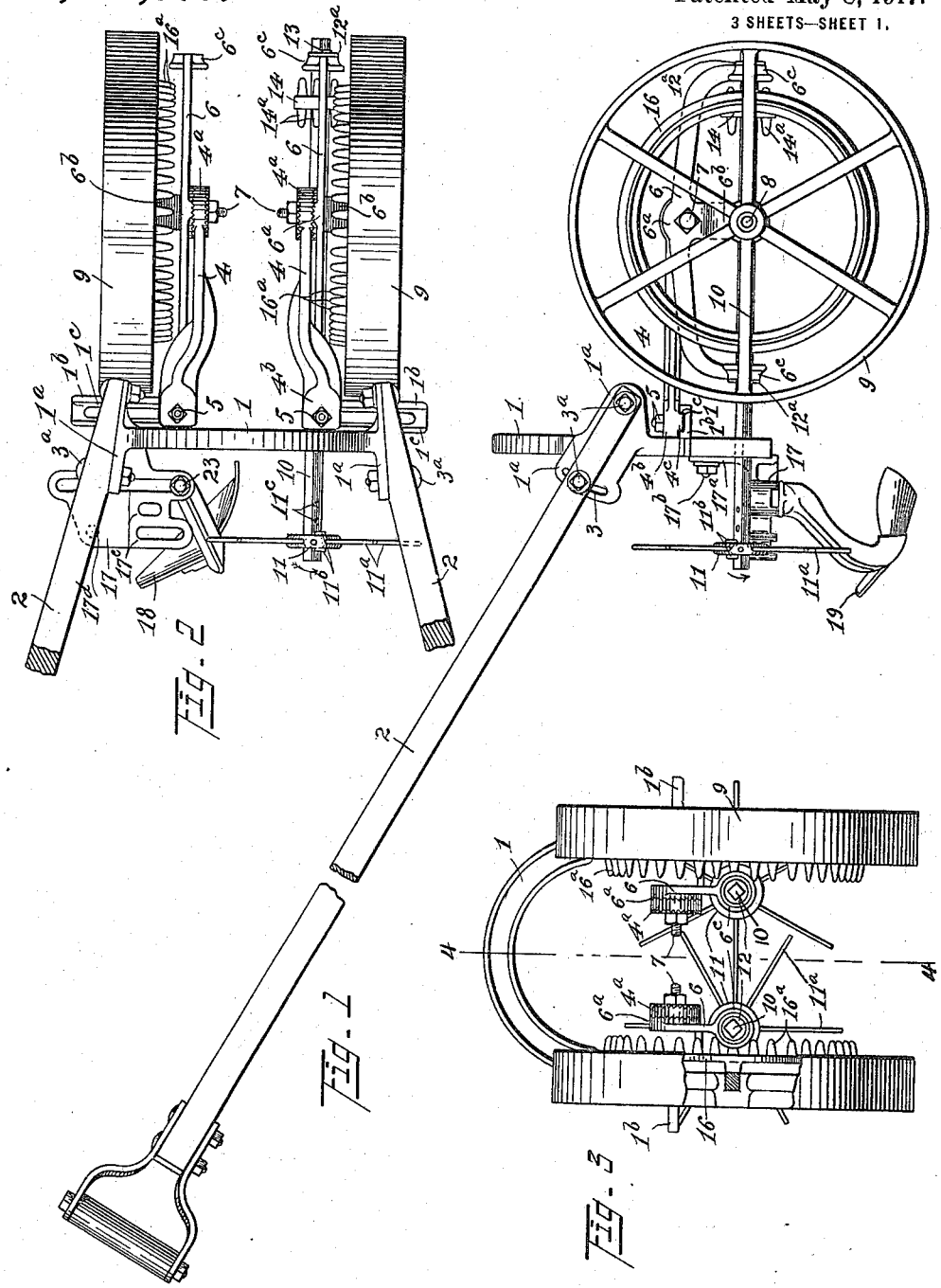

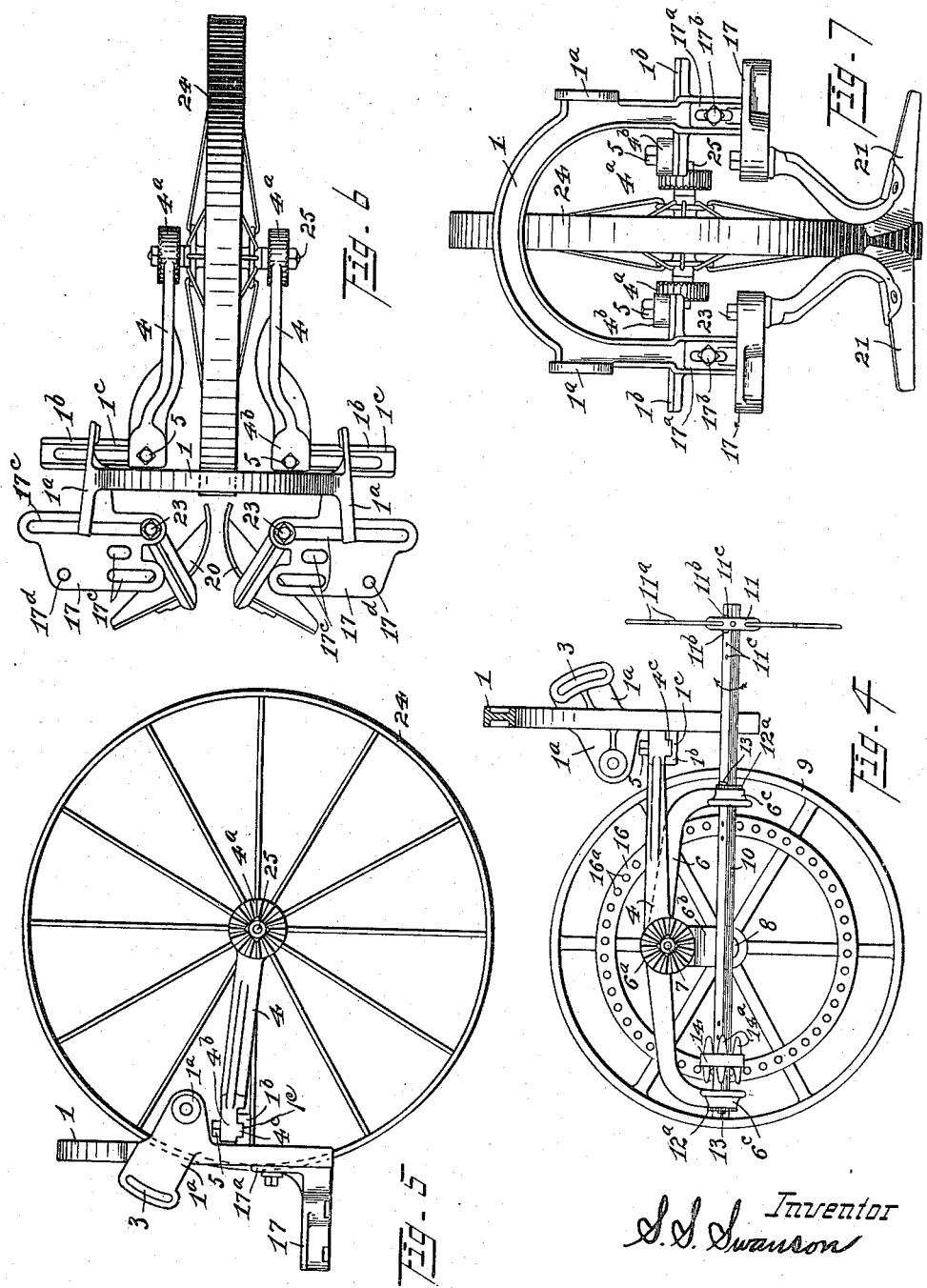

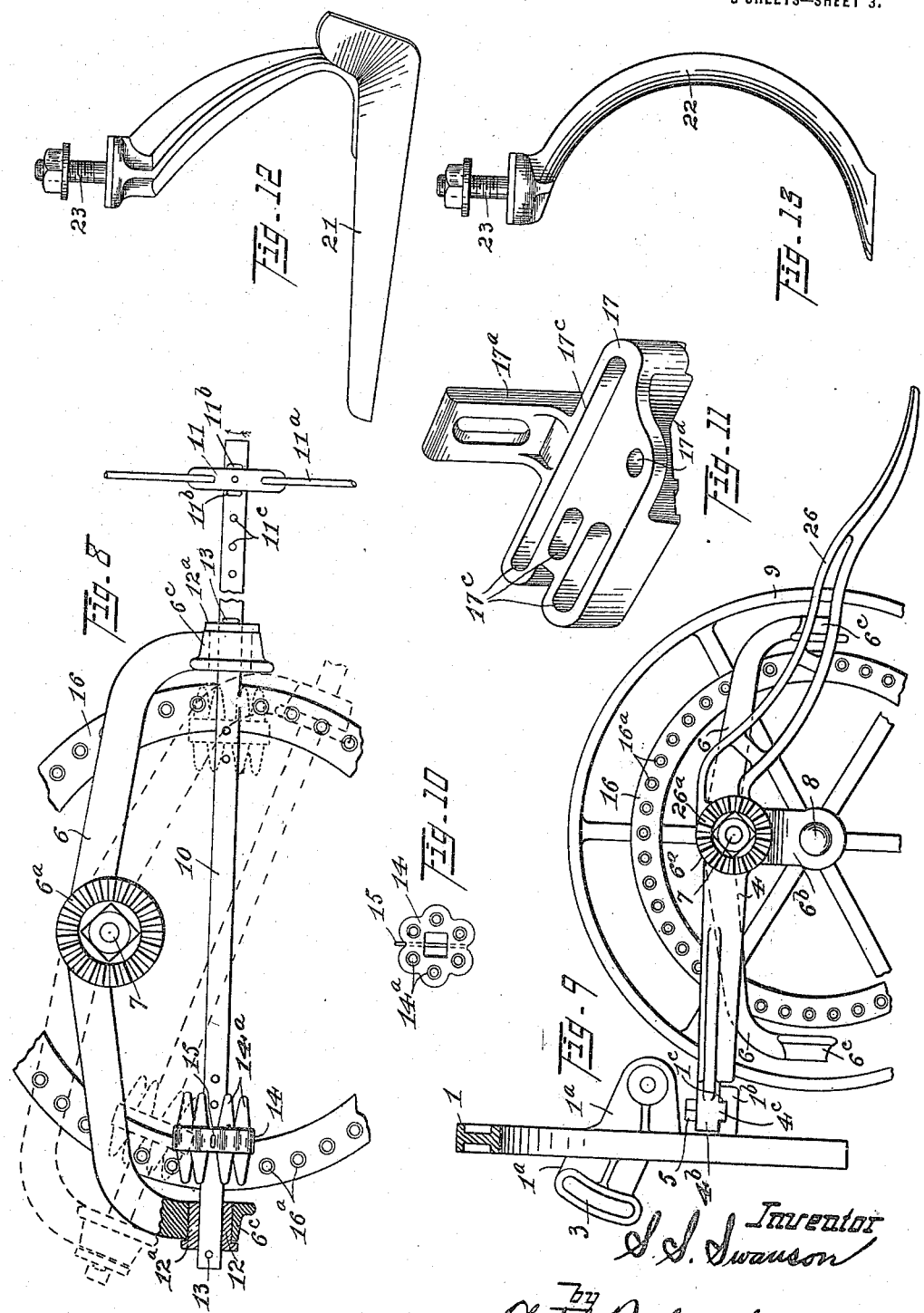

STARLEY S. SWANSON, OF BELLEVUE, OHIO.

ROTARY WEEDER AND CULTIVATOR.

1,224,975.  Specification of Letters Patent.  Patented May 8, 1917.

Application filed January 27, 1916. Serial No. 74,592.

*To all whom it may concern:*

Be it known that I, STARLEY S. SWANSON, a citizen of the United States, residing at Bellevue, in the county of Huron and State of Ohio, have invented certain new and useful Improvements in Rotary Weeders and Cultivators, of which the following is a specification.

My invention relates to improvements in rotary weeders and cultivators, the primary object being to provide a generally improved implement of this class of exceedingly simple, cheap, and efficient construction better adapted to its intended purposes than other devices of the same class or type with which I am acquainted.

The invention relates more particularly to improved rotary weeder or cultivator elements and means for attaching and adjusting the latter to meet the varying demands of actual service as well as the progressive stages of growth of the vegetable being cultivated, the present embodiment of this invention being particularly designed and adapted for use in the weeding or cultivation of onions, and similar or analogous vegetables, the improved implement being adapted to straddle the rows of growing vegetables whereby the rotary weeder and cultivator elements may be brought into close and proper proximity thereto for the purpose of mulching and cultivating the soil along and between the growing plants without in any way injuring the same, and at the same time destroying the sprouting and growing weeds without covering the growing plants or vegetables by the loosened soil.

A further object is to provide means for mounting and adjusting the rotary weeder elements or members whereby the prongs are adapted to revolve transversely to the line of travel or direction of the implement and at substantially right angles to the surface being cultivated, or in other words,— substantially parallel with and between the growing plants or vegetables, thereby reducing the liability of injury to the latter to a minimum, means being provided whereby during the early or initial cultivation of the onion or other plants one of the cultivator spider wheels or weeder elements may be placed slightly in advance of the other so that the radially extending weeder prongs thereof will overlap and extend into the row of growing vegetables thus enabling the soil in the row and between the growing plants to be stirred or mulched thereby destroying the sprouting or growing weeds between the plants. Practical experience with this implement has demonstrated that this may be done during the initial cultivation of the early or initial growth of such vegetables as onions without in any way injuring the same, this being particularly due to the fact that such vegetables or plants are more deeply rooted and of a more hardy character than ordinary sprouting or growing weeds.

A still further object is the provision of an improved arched frame, and adjustable weeder shaft and wheel and tool carrying brackets, together with improved driving gears and means for shifting such gears for reversing the direction of the rotation of the rotary weeder shafts and rotary weeder elements carried thereby, or in other words,—means whereby said rotary weeder elements or spider wheels may be revolved toward each other at their bottom (as in "hilling up" or the like) or may be reversed and caused to revolve in an opposite direction so that the weeder prongs or elements are revolved away from each other at their bottom and toward each other at their top, these changes in the direction of rotation being desirable for the purpose of meeting the various requirements during the various stages of growth and cultivation of the growing crop.

A still further object is the provision of an improved frame together with improved adjustable wheel and tool supporting and carrying brackets so arranged and disposed relative to each other and to the main or arched frame as to enable the same to be readily adapted for use either as a single or two-wheeled hand cultivator or garden implement, and to use all the various earth working tools or devices necessary to adapt the cultivator to the varying demands and stages of cultivation of the various vegetables to be cultivated.

A still further object is the provision of improved rotary weeder shafts together with improved means and bearings for removably and adjustably mounting the same therein.

With the above mentioned and other objects in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a side elevation of the improved cultivator, one side being equipped with a rotary cultivator or weeder element, and the other with a stationary cultivator element or shovel, for the purpose of illustrating the adaptability and interchangeability of the parts.

Fig. 2, a top plan view of the same.

Fig. 3, a front elevation of the same equipped with a pair of rotary cultivator elements, a portion of one of the cultivator ground or driving wheels being broken away for the purpose of clearer illustration of the rotary shaft gearing.

Fig. 4, a central vertical sectional view, taken on line 4—4 of Fig. 3, illustrating the inner sides of the weeder shafts and adjustable brackets and driving mechanism more in detail.

Fig. 5, a side elevation of the arched frame and attached bracket members provided with a single centrally located supporting wheel, the cultivator elements and handles being removed.

Fig. 6, a top plan view of the same equipped with a pair of stationary cultivator elements in the form of oppositely disposed shovels.

Fig. 7, a rear view of the same.

Fig. 8, an enlarged detached view of the inner side of the rotary weeder shaft and supporting brackets, the dotted lines indicating method of adjustment and reversal of direction of rotation of the weeder shaft, and certain parts being broken away for the purpose of clearer illustration.

Fig. 9, a central vertical sectional view, the weeder shaft and cultivator elements being removed, and the supporting brackets being provided with an adjustable forwardly extending clearing prong or arm constituting one of a pair of such members adapted to extend forwardly and at opposite sides of the row of growing plants to be cultivated.

Fig. 10, an end view of one of the slidably and reversibly mounted pin gears or pinions removed from the weeder shaft.

Fig. 11, a detached perspective view of one of the improved tool supporting brackets, adjustably and detachably secured to the rear of the arched cultivator frame.

Fig. 12, a detached detailed front elevation of one of the stationary elements or shovels adapted to be used with the improved cultivator Fig. 13, a detached side elevation of another form of cultivator element or tooth.

Similar numerals of reference designate like parts throughout all the figures of the drawings.

The frame of the improved cultivator or weeder is preferably in the form of an arched frame 1, the sides of said arched frame being preferably provided with handle supporting brackets 1$^a$, and terminating at their lower ends in horizontally extending slotted transverse brackets 1$^b$, adapted to adjustably receive and carry the adjustable bracket arms or members hereinafter described, and the handle supporting brackets 1$^a$, are adapted to receive and adjustably support the handles 2, through the medium of suitable attaching bolts and nuts 3$^a$, suitable slots 3, being formed in the supporting brackets 1$^a$, whereby the angles of the handles 2, may be varied and adjusted through the rear attaching bolts and nuts 3$^a$, in an obvious manner.

As a means of detachably and adjustably securing the geared wheels and weeder shaft, hereinafter described, to the transverse brackets 1$^b$, of the arched frame 1, whereby said wheels and weeder shafts and the cultivator elements carried thereby may be moved toward and from each other to adjust the same to the width and condition of the row of growing plants to be weeded or cultivated, a pair of bearing or attaching arms 4, is provided, said arms 4, terminating at one end in double-faced toothed or ratchet bearing heads 4$^a$, and at the other in attaching heads 4$^b$, the latter being provided on their under-sides with transversely extending guide ribs or flanges 4$^c$, adapted to fit into the correspondingly formed guide-ways 1$^c$, of the slotted transverse brackets 1$^b$, and as a means of clamping and securing the attaching heads 4$^b$, in adjusted position on the brackets 1$^b$, suitable clamping bolts and nuts 5, are mounted in the attaching heads 4$^b$, and extend through the slotted portions of the transverse brackets 1$^b$, whereby the bearing or attached arms 4, may be adjusted in any desired position, together with the cultivator ground or driving wheels and the geared rotary weeder shaft and cultivator elements carried thereby, as hereinafter fully described.

As a means of properly supporting the geared driving or cultivator wheels, and the rotary weeder shafts and cultivator elements hereinafter fully described, as well as adjustably attaching the same to the bearing or attaching arms 4, adjustable bearing brackets 6, are provided, said brackets being adapted, in the present instance, to support both the cultivator or driving wheels and the rotary weeder or driving shafts as now described. The brackets 6, are provided intermediate their ends with toothed heads 6$^a$, adapted to receive and coöperate with the toothed or ratchet bearing heads 4ᵃ, of the bearing or attaching arms 4, and to be adjustably secured thereto by means of attaching or clamping bolts 7, said bearing brackets terminating in axle supporting arms or members 6ᵇ, carrying axle bolts 8. The axle bolts 8, are removably mounted in the axle supporting members 6ᵇ, of the brackets and project on the outer sides thereof to carry the cultivator or driving wheels 9.

The ends of the adjustable bearing brackets 6, are preferably curved downwardly and are provided with bearing heads 6ᶜ, to receive and contain the bearing portions of the rotary shafts 10, said rotary shafts 10, being preferably of uniform angular shape throughout their length as a means of suitably supporting and receiving the movable and adjustably mounted reversing gears or pinions, and the rotary weeder elements or spider wheels, comprising hub members 11, and radially extending prongs 11ᵃ. By reason of the angular form of the weeder shafts 10, the bearing portions of said shafts within the bearing heads 6ᶜ, comprise bearing collars 12, provided with bearing flanges 12ᵃ, (see Figs. 4 and 8) said collars being provided with angular shaped openings to adjustably receive and contain the similarly shaped angular shafts 10, and being secured in place by means of cotter pins 13. The hub members 11, of the rotary weeder elements are secured in a similar manner by means of cotter pins 11ᵇ, and as a means of adjusting such weeder elements on the shafts 10, the latter may be provided with a series of cotter pin receiving openings 11ᶜ, as shown most clearly in Figs. 4 and 8 of the drawings.

As a means of providing an exceedingly simple, cheap, and efficient gearing for this particular class or type of implements, and particularly as a means of providing an improved method of shifting or reversing the gears or reversing the direction of the rotation of the rotary driving or weeder shafts 10, the latter are provided with improved reversing double-faced pin gears or pinions 14, slidably mounted on the weeder shafts 10, and adapted to be secured in adjusted position by means of securing elements such as cotter pins 15, it being obvious upon reference to Figs. 4 and 8 of the drawings, that the gears or pinions 14, comprise oppositely arranged coincident pin teeth 14ᵃ, adapted to mesh or travel in similarly spaced pin teeth 16ᵃ, of a pin gear 16, preferably cast integral with the cultivator or driving wheels 9, this form of gear being particularly desirable because of its permitting of the casting of the same in finished form. It will also be observed that the pin teeth 14ᵃ, and 16ᵃ, are admirably adapted to a wide range of adjustment and are not liable to become inoperative through wear or the action of sand, earth, or foreign substances, as in other forms of gears. When the pin gears or pinions 14, are in the position shown in full lines in the drawings, the shafts 10, and rotary weeder elements will be revolved in the direction indicated by the arrows, so that the prongs 11ᵃ, will be revolved toward each other at the bottom (a pair of rotary weeder shafts and elements being preferably employed in a rotary weeder), and when it is desired to reverse such direction of rotation the gears or pinions 14, may be loosened by the removal of the cotter pins 15, and then slidably moved upon the angular shaped shafts 10, to the dotted line position shown in and at the rear of Fig. 8 of the drawings so as to engage the diametrically opposite or rear portion of the pin gears 16, carried by the wheels 9, whereby the rotation of such parts in an opposite direction will take place in an obvious and well understood manner.

It will be understood that in use the horizontally extending bearing brackets 6, and the rotary weeder shafts and cultivator elements carried thereby are moved to an inclined position, to bring the tips of the prongs 11ᵃ, in proper proximity to the surface being cultivated, the toothed heads 6ᵃ, coöperating with the bearing heads 4ᵃ, enabling the brackets 6, to be adjusted and secured in any desired position through the medium of the clamping bolts 7.

As a means of adapting the improved implement for use either as an ordinary one or two-wheeled hand or garden cultivator, as well as adapting the same to receive and carry all the necessary or desired attachments or tools to be used in such connection, suitable tool carrying and supporting brackets 17, are detachably and adjustably connected to the lower rear side of the arched frame 1, each of said tool carrying brackets 17, comprising a main horizontally and laterally extending bracket, and a vertically extending slotted attaching shank 17ᵃ, the latter being adapted to be seated in the guide or channeled portion of the sides of the arched frame 1, and to be detachably and adjustably secured therein by means of the clamping bolts 17ᵇ. The main body portion or horizontally extending member 17, of each tool carrying bracket is provided with suitable tool or shank receiving openings, in the present instance, comprising a plurality of transversely extending slots 17ᶜ, and a shank receiving or bolt receiving opening 17ᵈ. The slots 17ᶜ, and openings 17ᵈ, enable the brackets to receive and carry a suitable number of suitably arranged earth working tools, and for the purpose of illustration, I have shown one of these brackets provided with a plow 18, in Fig. 2 of the drawings, and in Fig. 1, I have shown a hoe 19, it being understood, however, that these tools 18 and 19, are generally arranged in pairs, as likewise the weeder shafts and rotary weeder elements 10 and 11.

It will be understood, however, that the rotary and stationary species of earth working tools may be used simultaneously either singly upon opposite sides at the rear as shown in Figs. 1, and 2, of the drawings, or in pairs as illustrated in Figs. 3, 6, and 7, of the drawings.

In Fig. 6 of the drawings, I have shown the brackets 17, provided with a pair of plows 20, and in Fig. 7 of the drawings, I have shown the brackets equipped with a pair of hose 21, such hose being shown more in detail in Fig. 12 of the drawings. In Fig. 13 of the drawings, I have shown a cultivator tooth 22, and it will be observed, that all of these various tools are provided with threaded bolt or shank members 23, for mounting and securing the same in the openings or slots of the brackets 17.

As a means of transforming the improved element into a single or one-wheeled cultivator, as shown in Figs. 5, 6 and 7, of the drawings, it will be understood that the cultivator or driving wheels 9, and the rotary weeder shafts 10, and rotary weeder members 11, carried by the bearing bracket 6, may be readily detached by detaching the clamping bolts 7, and a single implement supporting wheel 24, may be interposed between the attaching heads 4ᵇ, of the bearing or attaching arms 4, and mounted therein by means of an axle bolt 25, the latter constituting, in the present instance, wheel carrying means for detachably and adjustably connecting an implement supporting wheel, which latter may be of any suitable size or form, it also being obvious that a pair of such wheels could be similarly attached and supported.

If desired, the implement may at any time be provided with vine guards 26, in the form of forwardly extending prongs or arms, as shown in Fig. 9 of the drawings, said guards or arms being provided with toothed or ratchet bearing heads 26ᵃ, interlocking with the toothed edge 6ᵃ, of the bearing brackets 6, and secured thereto by means of the clamping bolt 7.

Having thus described some of the embodiments of my invention, without having attempted to set forth all the forms in which it may be made, or all the modes of its use, what I claim and desire to secure by Letters Patent, is,—

1. In a cultivator, a frame, adjustable bearing arms and brackets carried thereby, and geared wheels and weeder shafts detachably and adjustably mounted on said bearing brackets.

2. In a cultivator, a frame provided with adjustable bearing arms and brackets thereon, geared wheels on said brackets, shafts carried on said brackets, and reversibly geared to said geared wheels and weeder elements carried by said shafts.

3. In a cultivator, a frame, bearing arms and brackets adjustable on said frame relatively to each other, geared wheels and weeder shafts adjustably mounted on said brackets, and means for reversing the rotation of said weeder shafts.

4. In a cultivator, an arched frame, bearing arms laterally adjustable thereon, adjustable, vertically inclinable bearing brackets on said bearing arms, geared wheels and weeder shafts on said bearing brackets, and means for reversing the direction of rotation of said weeder shafts by said geared wheels.

5. In a cultivator, a frame, laterally adjustable bearing arms thereon, horizontally extending inclinable bearing brackets adjustably mounted on said arms, geared wheels and weeder shafts mounted on said brackets and adjustable relative to said arms, and means for reversing the direction of rotation of said geared weeder shafts relative to said geared wheels.

6. In a cultivator, an arched frame having vertically extending sides terminating in slotted transverse brackets, horizontal bearing arms terminating at one end in toothed bearing heads and at their opposite ends in attaching heads having depending guide ribs seated in and interlocking with said slotted guide brackets, and wheel carrying means adjustably and detachably connected to said toothed bearing heads.

7. In a cultivator, an arched frame provided with handles and having sides terminating in transversely extending slotted base brackets, horizontally extending bearing arms having attaching heads interlocked with and laterally adjustable on the latter, said arms terminating at their opposite ends in ratchet bearing heads, and a tool carrying bracket detachably and adjustably connected to the side of said arched frame at the rear of and below the horizontal planes of said transversely extending slotted base brackets.

8. In a cultivator, an arched frame provided at its sides with laterally adjustable bearing arms, horizontally extending inclinable bearing brackets adjustable on said arms, cultivator driving wheels and rotary weeder shafts mounted on said brackets and adjustable therewith, said cultivator wheels being provided on their inner sides with pin gears, and double faced pin gears slidably and adjustably mounted on said shafts in coöperative relation to said cultivator wheel pin gears.

9. In a cultivator, the combination with an arched frame having vertically extending sides terminating in slotted transverse brackets, and horizontal bearing arms having attaching heads adjustably mounted on said slotted transverse brackets and extending forwardly from the latter and terminating in toothed bearing heads; of wheel and shaft carrying brackets provided with toothed heads detachably and adjustably connected to said toothed bearing heads of said horizontal bearing arms.

10. In a cultivator, the combination with a frame provided with laterally and vertically adjustable bearing brackets, and cultivator wheels and rotary weeder shafts carried thereby; of reversible gearing carried by said wheels and shafts, the gearing on said shafts being movable into and out of engagement with different passes of said wheel gearing whereby the rotation of said shafts may be reversed.

11. In a cultivator, a frame, adjustable brackets mounted thereon and pivotally and adjustably connected to each other, cultivator wheels and weeder shafts carried by some of said brackets, pin gears carried by said cultivator wheels, and reversible double faced pin gears longitudinally adjustable on said weeder shafts and movable into and out of engagement with the front and rear members of said pin gears whereby said weeder shafts may be reversed.

12. In a cultivator, the combination with a frame provided with laterally adjustable bearing brackets pivotally and adjustably connected to each other; of cultivator wheels carried by said brackets and provided on their inner sides with pin gears, polygonal weeder shafts provided with bearing collars mounted in some of said brackets, and double faced pin gears longitudinally adjustable on said angular shaped weeder shafts and movable selectively into and out of engagement with the front and rear members of said wheel pin gears whereby the rotation of said shafts may be reversed.

13. A cultivator, comprising a handled frame, forwardly extending bearing arms adjustable on said frame toward and from each other, horizontally extending and inclinable bearing brackets pivotally mounted for adjustment on said arms, cultivator wheels carried by said arms and brackets and provided on their inner sides with pin gears, and weeder shafts mounted in said brackets and provided with movable double faced pin gears adapted to be moved into engagement with the front and rear portions of said wheel pin gears whereby said shafts may be reversed in their direction of rotation.

14. In a cultivator, an arched frame provided at its top with upwardly and rearwardly extending handles and having its sides provided with slotted transverse brackets, said brackets being provided with guideways, horizontally extending wheel carrying bearing arms terminating at one end in toothed bearing heads and at their opposite end in attaching heads adjustably connected to said slotted transverse brackets, tool carrying brackets adjustably connected to the sides of said arched frame at the rear of said slotted transverse brackets. and horizontally extending inclinable bearing members having ratchet heads detachably and adjustably connected to said toothed bearing heads of said horizontal wheel carrying bearing arms.

In testimony whereof I have affixed my signature in the presence of two witnesses.

STARLEY S. SWANSON.

Witnesses:
 WM. H. ZIMMERMAN,
 DANIEL SELTZER.

Copies of this patent may be obtained for five cents each, by addressing the "Commissioner of Patents, Washington, D. C."